(12) United States Patent
Ramaraju et al.

(10) Patent No.: US 9,323,534 B2
(45) Date of Patent: Apr. 26, 2016

(54) METHOD AND APPARATUS FOR DETECTING A COLLISION BETWEEN MULTIPLE THREADS OF EXECUTION FOR ACCESSING A MEMORY ARRAY

(71) Applicant: FREESCALE SEMICONDUCTOR, INC., Austin, TX (US)

(72) Inventors: Ravindraraj Ramaraju, Round Rock, TX (US); Kathryn C. Stacer, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 427 days.

(21) Appl. No.: 13/831,850

(22) Filed: Mar. 15, 2013

(65) Prior Publication Data

US 2014/0282603 A1    Sep. 18, 2014

(51) Int. Cl.
*G06F 9/38*    (2006.01)
*G06F 9/52*    (2006.01)

(52) U.S. Cl.
CPC ... *G06F 9/38* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 4,924,422 A | 5/1990 | Vassiliadis et al. | |
| 5,754,819 A | 5/1998 | Lynch et al. | |
| 5,761,521 A | 6/1998 | Chilinski et al. | |
| 5,777,628 A | 7/1998 | Buck-Gengler | |
| 5,893,930 A * | 4/1999 | Song | 711/205 |
| 6,088,763 A | 7/2000 | Silberman et al. | |
| 6,374,342 B1 | 4/2002 | Sasahara | |
| 6,425,044 B1 | 7/2002 | Jeddeloh | |
| 6,681,313 B1 | 1/2004 | Trong et al. | |
| 6,707,752 B2 | 3/2004 | Zhang | |
| 6,711,654 B2 | 3/2004 | Rangan | |
| 6,738,890 B2 | 5/2004 | Ishikawa et al. | |
| 6,904,446 B2 | 6/2005 | Dibrino | |
| 6,944,088 B2 | 9/2005 | Asano et al. | |
| 6,957,315 B2 | 10/2005 | Chauvel | |
| 7,089,360 B1 | 8/2006 | Zhang | |
| 7,286,423 B2 | 10/2007 | Ramaraju | |
| 7,363,436 B1 | 4/2008 | Yeh et al. | |
| 7,669,034 B2 | 2/2010 | Bearden et al. | |
| 7,836,435 B2 | 11/2010 | Zhang et al. | |
| 7,984,229 B2 | 7/2011 | Ramaraju et al. | |
| 8,090,757 B2 | 1/2012 | Takahashi et al. | |
| 8,099,580 B2 | 1/2012 | Ramaraju et al. | |

(Continued)

OTHER PUBLICATIONS

Austin, T. et al., "Streamlining Data Cache Access with Fast Address Calculation," IEEE Proceedings of the 22nd Annual International Symposium on Computer Architecture, Jun. 22-24, 1995; pp. 369-380.

(Continued)

*Primary Examiner* — Emerson Puente
*Assistant Examiner* — Jonathan R Labud (57) ABSTRACT

A method includes determining, for a first thread of execution, a first speculative decoded operands signal and determining, for a second thread of execution, a second speculative decoded operands signal. The method further includes determining, for the first thread of execution, a first constant and determining, for the second thread of execution, a second constant. The method further compares the first speculative decoded operands signal to the second speculative decoded operands signal and uses the first and second constant to detect a wordline collision for accessing the memory array.

13 Claims, 3 Drawing Sheets

(56) References Cited

U.S. PATENT DOCUMENTS

| | | | |
|---|---|---|---|
| 8,356,160 | B2 | 1/2013 | Muff et al. |
| 8,380,779 | B2 | 2/2013 | Bruce et al. |
| 2003/0110198 | A1 | 6/2003 | Park |
| 2004/0133843 | A1 | 7/2004 | Yamakawa |
| 2005/0055490 | A1* | 3/2005 | Widell et al. ............... 711/1 |
| 2007/0028051 | A1 | 2/2007 | Williamson et al. |
| 2007/0033318 | A1 | 2/2007 | Gilday et al. |
| 2007/0094480 | A1* | 4/2007 | Ramaraju et al. ............ 711/220 |
| 2015/0006827 | A1 | 1/2015 | Ramaraju et al. |

OTHER PUBLICATIONS

Cortadella, J. et al., "Evaluation of A+B=K Conditions Without Carry Propagation," IEEE Transactions on Computers, vol. 41, No. 11, Nov. 1992; pp. 1484-1488.

Kwon, O. et al., "A 16-Bit by 16-Bit MAC Design Using Fast 5:3 Compressor Cells," Journal of VLSI Signal Processing 31, 77-89; Jun. 1, 2002; Kluwer Academic Publishers; pp. 77-89.

U.S. Appl. No. 13/440,728, filed Apr. 5, 2012, entitled "System and Method for Cache Access".

U.S. Appl. No. 13/831,580, filed Mar. 15, 2013, entitled "Method and Apparatus for Detecting a Collision Between Multiple Threads of Execution for Accessing a Memory Array".

Heald, R. et al., "64 kB Sum-Addressed-Memory Cache with 1.6-ns Cycle and 2.6-ns Latency," IEEE Journal of Solid-State Circuits, vol. 33, issue 11, Nov. 1998, pp. 1682-1689.

Juan, T., et al., "Reducing TLB Power Requirements," IEEE 1997 International Symposium on Low Power Electronics and Design, Aug. 18-20, 1997, pp. 196-201.

Non-Final Office Action mailed Jul. 19, 2012 for U.S. Appl. No. 12/474,451, 8 pages.

Notice of Allowance mailed Oct. 29, 2012 for U.S. Appl. No. 12/474,451, 6 pages.

Austin et al., "Streamlining Data Cache Access w/ Fast Address Calculation", 22nd Intl Symp on Computer Architecture, 1995.

Cortadella et al., "Evaluation of A+B=K Conditions w/o Carry Propagation", IEEE Transactions on Computers, Nov. 1992.

Heald, R., et al., "64 kB sum-addressed-memory cache with 1.6 ns cycle and 2.6 ns latency", IEEE JSSC, 1998, pp. 1682-1689, vol. 33, Issue: 11.

W. Lynch et al., "Low Load Latency through Sum-Addressed Memory (SAM)".

Notice of Allowance mailed Jun. 23, 2015 for U.S. Appl. No. 13/931,945, 9 pages.

* cited by examiner

METHOD AND APPARATUS FOR DETECTING A COLLISION BETWEEN MULTIPLE THREADS OF EXECUTION FOR ACCESSING A MEMORY ARRAY

FIELD

The present disclosure relates generally to memory arrays and more particularly to a method and system for detecting a collision between multiple threads of execution for accessing a memory array.

BACKGROUND

For some central processing unit (CPU) arrangements such as a dual-thread core processor, multiple threads of execution operate independently to access the same memory array. However, when the multiple threads attempt to access the same wordline of the shared memory array at the same time, a wordline collision occurs. This can result in incorrect data at the output of the memory array or the destruction of content, such as data or instructions, within the memory array.

In the prior art, base and offset operand addition can be used to address content within caches as well as data or instructions within other CPU memory units. Because an addition is performed to arrive at the effective address to access a wordline within the memory array storing the content, some dual-thread traditional processors take at least two clock cycles to access the memory array. A first clock cycle is used to add the base and offset operands for both threads and at least a second clock cycle is used to perform collision detection and access the memory array based on the results of the addition.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The present disclosure is illustrated by way of example and is not limited by the accompanying figures, in which like reference numbers indicate similar elements. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Also, the functions included in the flow diagrams do not imply a required order of performing the functionality contained therein.

DETAILED DESCRIPTION

In accordance with embodiments of the present disclosure, while effective address adders respectively calculate the effective addresses for a first thread of execution and a second thread of execution to access the same memory array, a parallel process is performed to determine a possible wordline collision between the two threads of execution as they attempt to access the memory array. These parallel operations enable faster collision determination than possible in prior art CPUs in order to mitigate against wordline collisions.

In accordance with one embodiment is a computer-implemented method for detecting a collision between multiple threads of execution for accessing a memory array. The method includes determining, for a first thread of execution, a first speculative decoded operands signal based on a first subset of consecutive bits from a first base operand and a first subset of consecutive bits from a first offset operand and determining, for a second thread of execution, a second speculative decoded operands signal based on a first subset of consecutive bits from a second base operand and a first subset of consecutive bits from a second offset operand. The method further includes comparing the first speculative decoded operands signal to the second speculative decoded operands signal. When the first speculative decoded operands signal and the second speculative decoded operands signal have an equivalent value, the method includes detecting a wordline collision between the first and second threads of execution for accessing the memory array, based on a first constant calculated for the first speculative decoded operands signal and a second constant calculated for the second speculative decoded operands signal.

In a further embodiment, the first constant comprises a first least significant bit value, calculated for a first speculative sum value used to generate the first speculative decoded operands signal, by summing a second subset of bits from the first base operand with a second subset of bits from the first offset operand; and the second constant comprises a second least significant bit value calculated, for a second speculative sum value used to generate the second speculative decoded operands signal, by summing a second subset of bits from the second base operand and a second subset of bits from the second offset operand. Moreover, in this example embodiment, the wordline collision is detected when the first least significant bit value is equal to the second least significant bit. Moreover, in accordance a further example implementation of the present teachings, the computer-implemented method is performed in parallel, meaning at the same or substantially the same time, with summing the first base operand with the first offset operand to determine a first effective memory address and with summing the second base operand with the second offset operand to determine a second effective memory address.

Figure 1:
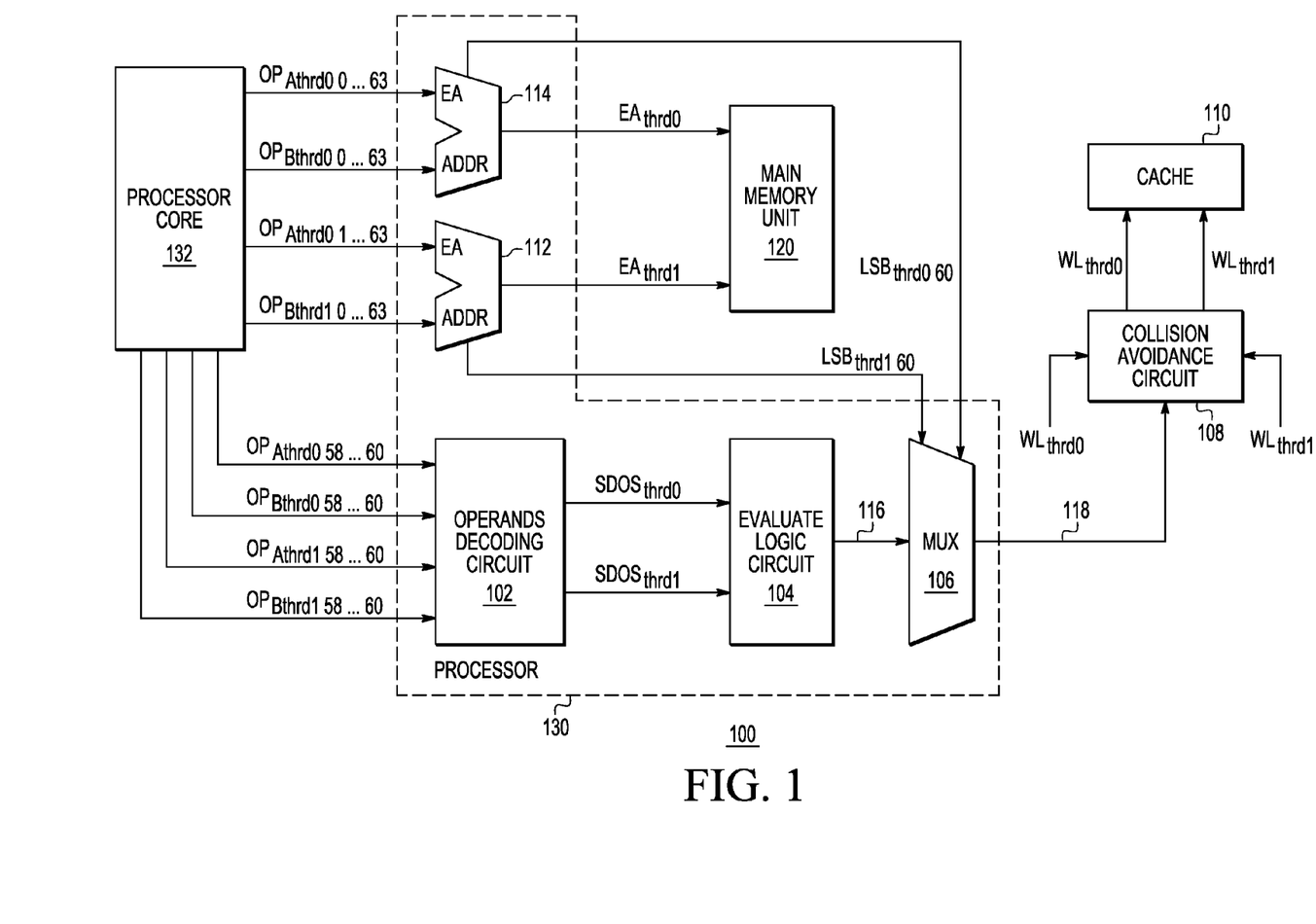
FIG. 1 is a generalized block diagram illustrating portions of a computer system in accordance with an embodiment.

FIG. 1 is a block diagram illustrating portions of a computer system in accordance with an embodiment of the present disclosure and indicated at 100. In an embodiment, system 100 includes components of a dual-thread single core CPU contained within a computer system, wherein two independent threads of execution, referred to herein as thread0 and thread1, within the context of a single CPU process share the same memory array. A thread of execution, or simply thread as is commonly called, is the smallest sequence of programmed instructions that can be managed independently by an operating system scheduler. Multiple threads of execution are used to simultaneously execute multiple instructions in a given cache pipeline stage at a time, for increased efficiency, decreased memory latency, increased throughput of computation per amount of hardware used, redundant computation, and/or error detection and recovery.

System 100 as illustrated includes an operands decoding circuit 102, a first logic circuit 114, a second logic circuit 112, and a third logic circuit comprising an evaluate logic circuit 104 and a multiplexer (MUX) 106, coupled to the operands decoding circuit 102 and the first and second logic circuits 114 and 112, respectively. System 100 further includes a collision avoidance circuit 108 and a memory array 110. The first and second logic circuits 114 and 112, operands decoding circuit 102, evaluate logic circuit 104, and MUX 106 make up a part of the "processor" 130 of the CPU, which performs data processing operations. The CPU further includes a processor core 132 that functions as a control unit by regulating the processor, including providing operands and partial operands to processor elements for performing their processing functions.

Figure 3:
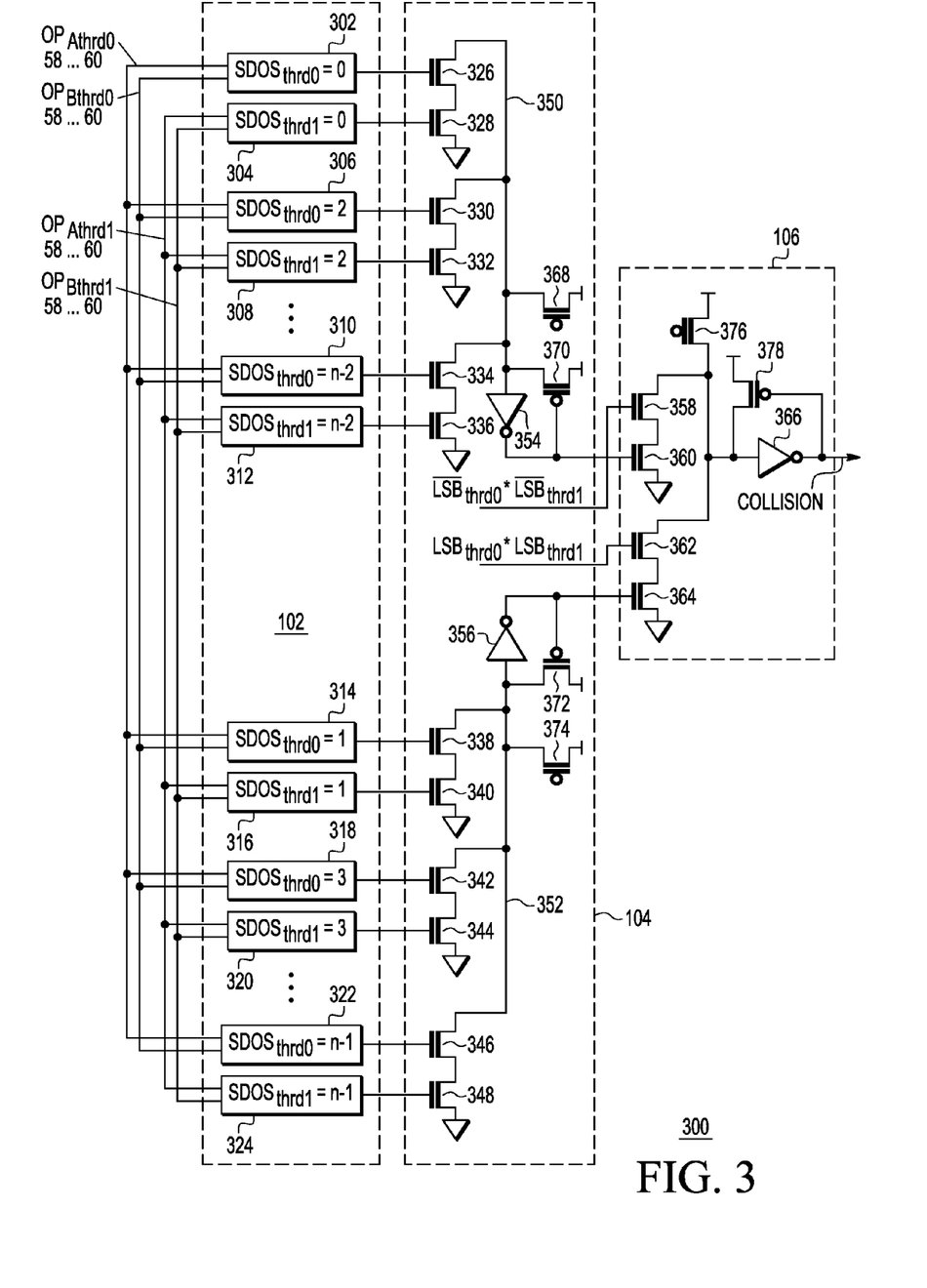
FIG. 3 is a circuit diagram depicting in more detail some of the system elements shown in FIG. 1.

The hardware used to implement the operands decoding circuit 102, evaluate logic circuit 104 and multiplexer 106 are described in further detail with respect to FIG. 3. In an embodiment, the first logic circuit 114 comprises a first adder circuit, and the second logic circuit 112 comprises a second adder circuit. The adder circuits are also referred to as effective address (EA ADDR) adders, as shown in FIG. 1. Each EA ADDR comprises a digital circuit that performs base address or operand ($OP_A$) and offset address or operand ($OP_B$) addition to calculate an effective address. The effective addresses, output from EA ADDRs 112 and 114, or portions thereof, are used by various components of the computer system such as the main memory unit 120, the collision avoidance circuit 108, the cache 110, etc.

The collision avoidance circuit 108 comprises digital logic circuitry that enables only one memory array access to occur at a given point in time if two threads of execution attempt to access the same wordline within the memory array 110 at the same time. Such circuitry can include, for instance, an AND or NAND gate that combines the wordline collision signal 118 with either $WL_{thrd0}$, which is a wordline determined for thread0, or $WL_{thrd1}$, which is a wordline determined for thread1, in order to correspondingly stop or prevent the memory access for either the $WL_{thrd0}$ or the $WL_{thrd1}$ until a later time. Alternatively, the collision avoidance circuit includes one or more delay elements that delay one of the wordline accesses. Additional circuitry could be incorporated into the collision avoidance circuit to select the one of the two threads that is allowed access to the memory array 110 during a collision event. Such circuitry could employ some type of arbitration method such as a round robin scheme, a priority scheme, etc.

In an embodiment, the main memory unit 120 is a Dynamic Random Access Memory (DRAM) that resides off-chip from the CPU. At least some of the content, e.g., frequently accessed data and/or instructions, of the main memory unit 120 is stored in the memory array 110. In one embodiment, the memory array 110 is a cache that resides on-chip with the CPU, and can be implemented as a Static Random Access Memory (SRAM) for instance. In one example implementation, the cache 110 comprises a first cache in a plurality of caches arranged in a hierarchy, such as an L1 or level cache in a multi-level cache. In an alternative arrangement, the main memory unit 120 is included on-chip with the CPU, and the cache 110 is part of the main memory unit 120. In a further embodiment, collision avoidance can be performed for a memory array other than the cache, which resides either on-chip or off-chip from the CPU.

In a further embodiment, the cache 110 is divided or organized into two banks of memory cells, e.g., an even bank or array and an odd bank or array, that are independently accessed using separate sum and decode operations, which is explained in further detail below. The even bank includes only even-numbered wordlines, e.g., 0, 2, 4, etc., or entries that are addressed using even numbered wordlines. The odd bank includes only odd-numbered wordlines, e.g., 1, 3, 5, etc., or entries that are addressed using odd numbered wordlines. As used herein, a wordline (WL) is an address of an entry in a memory array or an actual memory array entry, e.g., comprising a row of memory cells, as the context indicates. In one example implementation, the cache 110 includes sixteen wordline entries, with eight entries addressed using even numbered wordlines and eight entries addressed using odd numbered wordlines. However, the cache 110 can include any number of entries that, for instance, enable the cache to maintain a lower latency than the latency associated with accessing the main memory unit 120. Although in this example implementation the cache 110 is divided into two banks, the even bank and the odd bank, in an alternative arrangement the cache could be divided into any number of banks each independently accessed.

Figure 2:
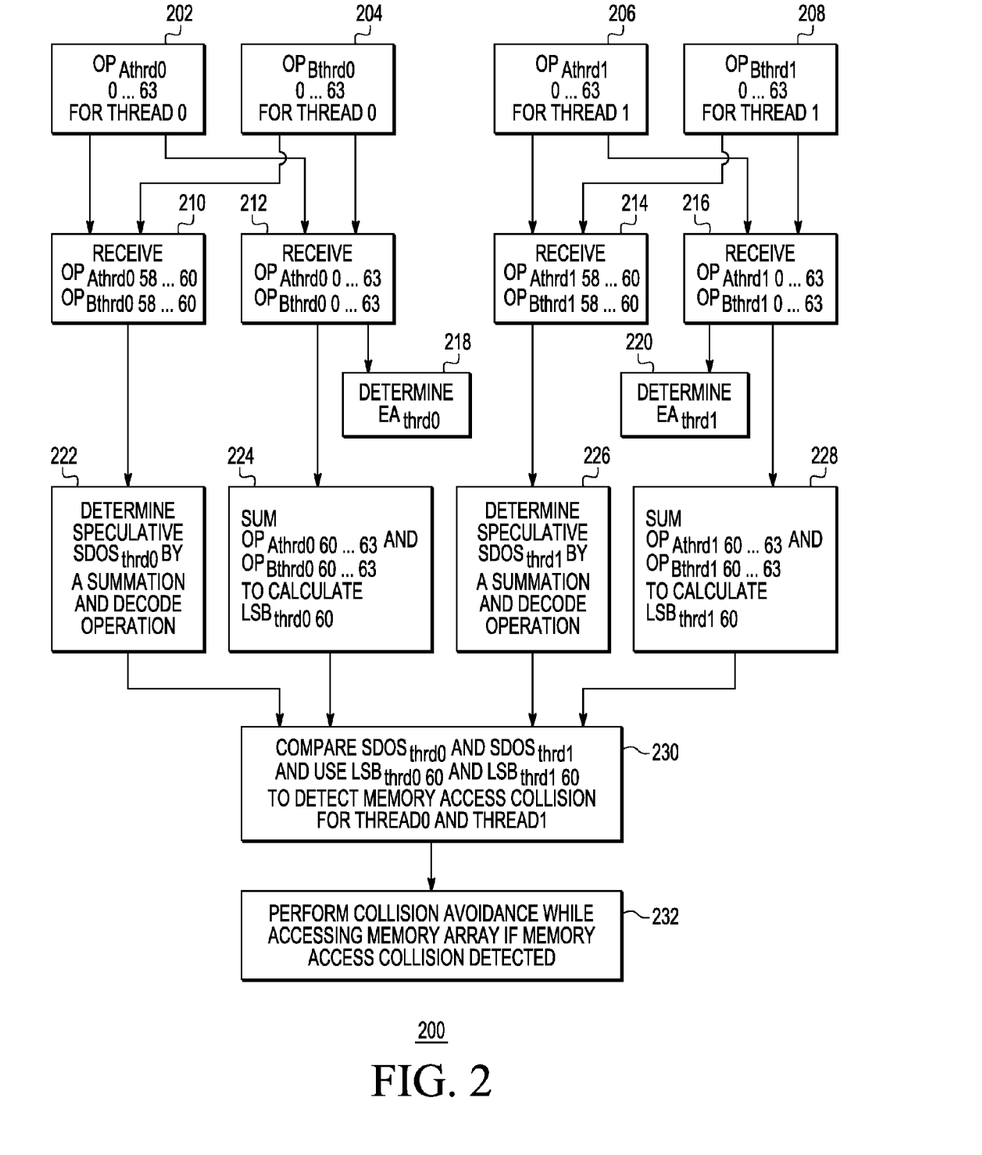
FIG. 2 is a flow diagram illustrating a method for detecting a collision between multiple threads of execution for accessing a shared memory array in accordance with an embodiment.

Turning now to FIG. 2, which shows a flow diagram illustrating a method 200, performed in a computer system, for detecting a collision between multiple threads of execution for accessing a memory array, in accordance with an embodiment. In one example implementation, elements of system 100 shown in FIG. 1 are configured to perform method 200. As such, the flow diagram of FIG. 2 and inputs and outputs to the elements 102-114 and 120 shown in FIG. 1 are concurrently described below. In general, a number of parallel operations are performed by the elements of system 100, as illustrated by the method 200. Method 200 may be performed, for example, when a computer system executes an application or program characterized by a set of instructions or program code.

In this particular embodiment, memory addressing is computed by adding a base operand to an offset operand, for an instruction, to arrive at an effective address for accessing content within a memory array, such as the main memory unit 120. Namely, parallel addition operations are performed by the EA ADDR 114 using functions 212 and 218 and the EA ADDR 112 using functions 216 and 220 to individually compute an effective address used by the computer system 100.

More particularly with respect to the method 200, at 202 and 204, respectively, while the CPU is executing code, a first base operand $OP_{Athrd0}$ and a first offset operand $OP_{Bthrd0}$ is presented by the processor core 132 for a first thread of execution, thread0. Similarly, at 206 and 208, respectively, a second base operand $OP_{Athrd1}$ and a second offset operand $OP_{Bthrd1}$ is presented by the processor core 132 for a second thread of execution, thread1. In an embodiment, each operand comprises 64 bits or binary digits, e.g., bits 0 to 63, wherein bit 63 is a least significant bit (LSB) for the operand and bit 0 is a most significant bit (MSB) for the operand. The LSB, in this example, is the rightmost bit of a sequence of bits such as an operand or a portion of an operand; and the leftmost bit of the bit sequence is correspondingly the MSB. Moreover, each bit within the operand has a bit value of, equivalent to, or corresponding to a binary zero (0) or a binary one (1). In an alternative embodiment, the operands have more or fewer bits. In other embodiments, the significance of the bits might be reversed so that the higher-numbered bit is more significant than the lower-numbered bit.

The EA ADDR 114 is configured to receive the first base operand $OP_{Athrd0}$ and the first offset operand $OP_{Bthrd0}$, at 212. The EA ADDR 114 is further configured to operate concurrently in time with the operands decoding circuit 102 and the third logic circuit comprising 104 and 106 to sum, at 218, the first base operand with the first offset operand to determine a first effective memory address $EA_{thrd0}$. Similarly, the EA ADDR 112 is configured to receive the second base operand $OP_{Athrd1}$ and the second offset operand $OP_{Bthrd1}$, at 216. The EA ADDR 112 is further configured to operate concurrently in time with the operands decoding circuit 102 and the third logic circuit comprising 104 and 106 to sum, at 220, the second base operand with the second offset operand to determine a second effective memory address $EA_{thrd1}$. The EA ADDR 114 is further configured to generate at 224 a first constant, also referred to herein as a first selection bit, which is defined as a single bit value of binary 1 or binary 0 that is provided to the MUX 106. Likewise, the EA ADDR 112 is further configured to generate at 228 a second constant, also referred to herein as a second selection bit, which is provided to the MUX 106. The generation of the first and second constants is described below in additional detail.

As mentioned above, EA ADDR 114 and EA ADDR 112 perform their operations in parallel or concurrently in time with operations performed by the operands decoding circuit 102, the evaluate logic circuit 104, and the MUX 106, the description of which follows. At 210 and 214, respectively, the operands decoding circuit 102 receives a first subset of consecutive bits from the first base operand $OP_{Athrd0}$, a first subset of consecutive bits from the first offset operand $OP_{Bthrd0}$, a first subset of consecutive bits from the second base operand $OP_{Athrd1}$, and a first subset of consecutive bits from the second offset operand $OP_{Bthrd1}$. A subset of bits from an operand is also referred to herein as a partial operand. As used herein, a subset means a portion, part, or less than all of something and, in this case, a portion, part, or less than all of the bits of an operand. Consecutive means each bit follows immediately after each other bit in a sequence. In one embodiment, each subset of bits received by the operand decoding circuit 102 contains the same number of bits such as two, three, or four bits, for instance.

In a particular embodiment, the subset of consecutive bits contained within each partial operand received into the operands decoding circuit 102 comprises bits 58 to 60 of the corresponding operand, wherein the LSB of the subset is bit 60, and the MSB of the subset is bit 58. Thus, the first subset of consecutive bits from the first base operand $OP_{Athrd0}$ is labeled as $OP_{Athrd0}$ 58 . . . 60. The first subset of consecutive bits from the first offset operand $OP_{Bthrd0}$ is labeled as $OP_{Bthrd0}$ 58 . . . 60. The first subset of consecutive bits from the second base operand $OP_{Athrd1}$ is labeled as $OP_{Athrd1}$ 58 . . . 60; and the first subset of consecutive bits from the second offset operand $OP_{Bthrd1}$ is labeled as $OP_{Bthrd1}$ 58 . . . 60. In an embodiment, the same bits, e.g., 58 to 60, are used in a separate process to determine a wordline for thread0, e.g., $WL_{thrd0}$, and a wordline for thread1, e.g, $WL_{thrd1}$, for accessing the memory array 110. However, a different number of bits can be used for wordline generation in an alternative embodiment.

Returning again to method 200, at 210, the operands decoding circuit 102 receives $OP_{Athrd0}$ 58 . . . 60 and $OP_{Bthrd0}$ 58 . . . 60 and is configured to determine at 222, for a first thread of execution, a first speculative decoded operands signal, $SDOS_{thrd0}$, based on $OP_{Athrd0}$ 58 . . . 60 and $OP_{Bthrd0}$ 58 . . . 60. In addition, at 214, the operands decoding circuit 102 receives $OP_{Athrd1}$ 58 . . . 60 and $OP_{Bthrd1}$ 58 . . . 60 and is configured to determine at 226, for a second thread of execution, a second speculative decoded operands signal, $SDOS_{thrd1}$, based on $OP_{Athrd1}$ 58 . . . 60 and $OP_{Bthrd1}$ 58 . . . 60. In an embodiment, $SDOS_{thrd0}$ and $SDOS_{thrd01}$ are determined using a summation, meaning addition, and decode operation.

For example, determining the first speculative decoded operands signal $SDOS_{thrd0}$ comprises deriving a first speculative sum value from summing the first subset of consecutive bits from the first base operand, $OP_{Athrd0}$ 58 . . . 60, with the first subset of consecutive bits from the first offset operand, $OP_{Bthrd0}$ 58 . . . 60. The first speculative sum value and the first speculative decoded operands signal are labeled as "speculative" because they are derived from an addition operation that has no carry-in to the addition of the LSBs from the two partial operands. A further decode of the first speculative sum value is performed to associate the speculative sum value to a given mapped value, wherein the mapping generates or produces a particular first speculative decoded operands signal $SDOS_{thrd0}$. In one example implementation, the number of mapped values, n, is equal to a number of possible base 2 values, i.e., $2^r$, which can be generated by the number of bits, r, in the subset of consecutive bits. Therefore, in this case, where the number of bits, r, in the subset of consecutive bits is 3, the number of mapped values, n, is $2^3$ or 8, and can be the values 0 to 7. Where a different number of bits, r, is included in the subset of consecutive bits, the possible number of mapped values is correspondingly different.

Similarly, determining the second speculative decoded operands signal $SDOS_{thrd1}$ comprises deriving a second speculative sum value from summing the first subset of consecutive bits from the second base operand, $OP_{Athrd1}$ 58 . . . 60, with the first subset of consecutive bits from the second offset operand, $OP_{Bthrd1}$ 58 . . . 60. A further decode of the second speculative sum value is performed to associate the speculative sum value to a given mapped value, wherein the mapping generates or produces a particular second speculative decoded operands signal $SDOS_{thrd1}$. Since the number of bits, r, in the subset of consecutive bits is 3, the number of mapped values, n, is $2^3$ or 8, and can be the values 0 to 7.

At 230, the third logic circuit receives the first speculative decoded operands signal, $SDOS_{thrd0}$, the second speculative decoded operands signal, $SDOS_{thrd1}$, the first constant or selection bit and the second constant or selection bit. The third logic circuit is configured to compare the first speculative decoded operands signal to the second speculative decoded operands signal and to use the first and second constants to detect a wordline collision, between the first and second threads of execution, for accessing the memory array 110. A wordline collision means an event where the first thread of execution and the second thread of execution would attempt to access the same wordline of the memory array 110 at the same time. A wordline collision is also referred to herein as a memory access collision.

More particularly, the evaluate and logic circuit 104 of the third logic circuit receives the first speculative decoded operands signal, $SDOS_{thrd0}$, and the second speculative decoded operands signal, $SDOS_{thrd0}$. The evaluate and logic circuit 104 is configured to compare the first speculative decoded operands signal, $SDOS_{thrd0}$, to the second speculative decoded operands signal, $SDOS_{thrd1}$, and to generate an output signal 116 when $SDOS_{thrd0}$ matches $SDOS_{thrd1}$, for instance when both $SDOS_{thrd0}$ and $SDOS_{thrd1}$ map to the same base 2 value or, in other words, have the same or an equivalent value. The multiplexer 106 of the third logic circuit receives the first and second constants and any output signal, e.g., 116, from the operands decoding circuit 104 to detect a wordline collision between the first and second threads for accessing the memory array 110.

In an embodiment, the wordline collision, between the first and second threads of execution, for accessing the memory array is indicated when the first speculative decoded operands signal $SDOS_{thrd0}$ matches the second speculative decoded operands signal $SDOS_{thrd1}$ and the first constant matches the second constant. In a specific embodiment, the multiplexer circuit 106 is configured to use the first and second constants as first and second selection bits to detect the wordline collision when the first speculative decoded operands signal $SDOS_{thrd0}$ matches the second speculative decoded operands signal $SDOS_{thrd1}$.

In the particular embodiment of circuits 102, 104, and 106 shown in and explained below by reference to FIG. 3, an even wordline collision, between the first and second threads of execution, for accessing the memory array 110 is indicated in some instances when the first and second constants each have a value that is equivalent to a binary zero. An even wordline collision is an attempt, by the first and second threads of operation, to access the same even-numbered wordline of the memory array 110 at the same time. Whereas, an odd wordline collision, between the first and second threads of execution, for accessing the shared memory array 110 is indicated in some instances when the first and second constants each have a value that is equivalent to a binary one. An odd wordline collision is an attempt, by the first and second threads of operation, to access the same odd-numbered wordline of the shared memory array 110 at the same time.

Turning back momentarily to the generation of the first and second constants in functional blocks 224 and 228, respectively. As mentioned earlier, the first and second constants are also referred to herein as first and second selection bits. In the embodiment, described below by reference to FIG. 3, the constants serve as a two-bit input used to select an even signal line or an odd signal line, depending on the value of the selection bits, when the selection bits have the same or an equivalent value.

In an embodiment, the first constant is an actual first least significant bit value calculated for the first speculative sum value. The first adder circuit 114 is configured to generate the first selection bit comprising the least significant bit value calculated for the first speculative sum value, which, as explained above, is used to generate the first speculative decoded operands signal $SDOS_{thrd0}$. Similarly, the second constant is an actual second least significant bit value calculated for the second speculative sum value. The second adder circuit 112 is configured to generate the second selection bit comprising the least significant bit value calculated for the second speculative sum value, which, as explained above, is used to generate the second speculative decoded operands signal $SDOS_{thrd1}$.

As described above, the partial operands used to generate the first speculative sum value and the second speculative sum value comprise bits 58 to 60. However, only a "speculative" sum could be generated since there was no carry-in available to the addition operation for the LSB 60. Therefore, any match between the first speculative decoded operands signal, $SDOS_{thrd0}$, and the second speculative decoded operands signal, $SDOS_{thrd1}$, as determined by the evaluate logic circuit 104 is only a speculative or tentative match. The corresponding true or actual LSB 60 is needed for each speculative sum value to determine a true or actual match between $SDOS_{thrd0}$ and $SDOS_{thrd1}$.

Accordingly, the adder circuit 114 is configured to generate a true sum of the first base and offset operands for thread0. Therefore, the adder circuit 114 can further provide a true LSB 60 for thread0, referred to as $LSB_{thrd0}$ 60, which is the bit 60 carry-out resulting from adding, for the thread0, bits 60 to 63 of the base operand with bits 60 to 63 of the offset operand. In this manner the first logic circuit, which is the EA ADDR 114, is configured to determine, for the first thread of execution thread0, a first constant $LSB_{thrd0}$ 60 based on a second subset of bits 60 . . . 63 from the first base operand and a second subset of bits 60 . . . 63 from the first offset operand. Similarly, the adder circuit 112 is configured to generate a true sum of the second base and offset operands for thread1. Therefore, the adder circuit 112 can provide a true LSB 60 for thread1, referred to as $LSB_{thrd1}$ 60, which is the bit 60 carry-out resulting from adding, for the thread1, bits 60 to 63 of the base operand with bits 60 to 63 of the offset operand. In this manner the second logic circuit, which is the EA ADDR 112, is configured to determine, for the second thread of execution thread1, a second constant $LSB_{thrd1}$ 60 based on a second subset of bits 60 . . . 63 from the second base operand and a second subset of bits 60 . . . 63 from the second offset operand.

Returning again to method 200, upon detecting the memory access collision at 230, the MUX 106 provides a signal 118 to the collision avoidance circuit 108. The signal 118 indicates that a memory access collision can occur if collision avoidance or mitigation is not performed. The collision avoidance circuit 108 receives the wordline for thread0, $WL_{thrd0}$, and the wordline for thread1, $WL_{thrd1}$. Where no signal 118 is received, the collision avoidance circuit 108 is configured to simply allow normal access to the cache 110. Conversely, upon receipt of the signal 118, the collision avoidance circuit 108 is configured to perform collision avoidance, at 232. In an embodiment, collision avoidance comprises preventing access by one of the wordlines $WL_{thrd0}$ or $WL_{thrd1}$ to the memory array 110. This can be referred to as a wordline kill. In an alternative embodiment, collision avoidance comprises delaying access by one of the wordlines $WL_{thrd0}$ or $WL_{thrd1}$ to the memory array 110 to prevent an undesired contemporaneous access to the same wordline.

Turning now to FIG. 3, illustrated therein is a circuit diagram 300 depicting in more detail the operands decoding circuit 102, the evaluate logic circuit 104, and the MUX 106 shown in FIG. 1. As mentioned above, the operands decoding circuit 102 receives $OP_{Athrd0}$, $OP_{Bthrd0}$, $OP_{Athrd1}$, and $OP_{Athrd1}$ and performs an addition and decode operation on these four partial operands to generate the first speculative decoded operands signal $SDOS_{thrd0}$ and the second speculative decoded operands signal $SDOS_{thrd1}$. A known logic circuit can be used for this purpose, which takes each pair of operands and performs a fused addition and decode operation to map into $2^r$ signals based on r number of bits in the partial operands. One such known circuit receives each pair of partial operands into a PGZO generation circuit, which combines the pairs of bits for each pair of partial operands using logical operators (XOR, OR, AND, NAND) to create the PGZO values for each pair of bits from each pair of partial operands. The PGZO values are provided to a speculative decoded operands signal (SDOS) generation block within each of a plurality of SDOS circuits, with each SDOS circuit configured to generate a SDOS signal. Further, as mentioned in the above embodiment, each potential speculative decoded operands signal is mapped to and represents one of $2^r$=n number of values, where r is the number of bits in the partial operands $OP_{Athrd0}$, $OP_{Bthrd0}$, $OP_{Athrd1}$, and $OP_{Bthrd1}$, and n is the total number of mapped values. In this illustration, there are n=8 total mapped values.

Accordingly, the embodiment of the operands decoding circuit 102 shown in FIG. 1, thus, includes $2^r=2^3$=n=8 number of speculative decoded operands signal (SDOS) circuits for each pair of partial operands or a total of 2×8=16 number of SDOS circuits. However, only twelve such SDOS circuits 302, 304, 306, 308, 310, 312, 314, 316, 318, 320, 322, and 324 are shown for visual clarity. Each of eight of the sixteen SDOS circuits receives as inputs partial operands $OP_{Athrd0}$ and $OP_{Bthrd0}$ and performs an addition and decode operation to output a signal when the decoded sum of the two partial operands corresponds to one of eight mapped values, e.g., 0 to 7. Similarly, the remaining eight of the sixteen SDOS circuits receives as inputs partial operands $OP_{Athrd1}$ and $OP_{Bthrd1}$ and performs an addition and decode operation to output a signal when the decoded sum of the two partial operands corresponds to one of the eight mapped values.

In the embodiment illustrated, even SDOS circuits, which are SDOS circuits that output a signal mapped to an even number, with zero being an even number, are grouped together and coupled to an even signal line 350 in the evaluate logic circuit 104. Odd SDOS circuits, which are SDOS circuits that output a signal mapped to an odd number, are grouped together and coupled to an odd signal line 352 in the evaluate logic circuit 104. Moreover, the SDOS circuits that output signals corresponding to the same mapped value are paired and coupled together. One of the SDOS circuits in each pair receives the partial operands $OP_{Athrd0}$ and $OP_{Bthrd0}$ as inputs. The other SDOS circuit in the pair receives the partial operands $OP_{Athrd1}$ and $OP_{Bthrd1}$ as inputs.

For example, SDOS circuits 302 and 304, which output a value corresponding to a decoded sum of operands value of zero, are paired and coupled to the even signal line 350. SDOS circuits 306 and 308, which output a value corresponding to a value of two, are paired and coupled to the even signal line 350. SDOS circuits 310 and 312, which output a value corresponding to a value of n−2=6, are paired and coupled to the even signal line 350, and so on for all of the even numbered values. Likewise, SDOS circuits 314 and 316, which output a value corresponding to a value of one, are paired and coupled to the odd signal line 352. SDOS circuits 318 and 320, which output a value corresponding to a value of three, are paired and coupled to the odd signal line 352. SDOS circuits 322 and 324, which output a value corresponding to a value of n−1=7, are paired and coupled to the odd signal line 352, and so on for all of the odd numbered values. SDOS circuits 302, 306, 310, 314, 318, and 322 receive the partial operands $OP_{Athrd0}$ and $OP_{Bthrd0}$ as inputs. SDOS circuits 304, 308, 312, 316, 320, and 324 receive the partial operands $OP_{Athrd1}$ and $OP_{Bthrd1}$ as inputs.

The evaluate logic circuit 104 embodiment shown in FIG. 3 comprises a plurality of N-channel complementary metal-oxide semiconductor (NMOS) pull-down transistors 326, 328, 330, 332, 334, 336, 338, 340, 342, 344, 346, and 348; a plurality of P-channel complementary metal-oxide semiconductor (PMOS) transistors 368, 370, 372, and 374; and a plurality of inverters 354 and 356. As shown, the NMOS transistors are connected in series as matched pairs, e.g., having the same or substantially the same threshold voltage, with each pair further being connected to a pair of SDOS circuits and connected to either the even signal line 350 or the odd signal line 352.

For example, NMOS transistors 326 and 328 are connected in series, with the source of transistor 328 connected to a ground potential, referred to as ground, and the drain of transistor 328 connected to the source of transistor 326 and with the drain of transistor 326 connected to the even signal line 350. Moreover, the gate of the transistor 326 is connected to the output of the SDOS circuit 302; and the gate of the transistor 328 is connected to the output of the SDOS circuit 304. During operation, the drain of transistor 326 is pulled low to, e.g., to ground, only when a high enough signal is input into the gates of both transistors 326 and 328 to turn on these transistors. As such, the transistors 326 and 328 can serve to "compare" the inputs at their respective gates and output a low signal when signals from both SDOS circuits 302 and 304 are at a "high" value. A high signal received into the gate of the NMOS transistor 326, is the speculative decoded operands signal for thread 0, $SDOS_{thrd0}$, output from the operands decoding circuit 102. A high signal received into the gate of the NMOS transistor 328, is the speculative decoded operands signal for thread 0, $SDOS_{thrd1}$, output from the operands decoding circuit 102.

Series connected transistors 330 and 332 are similarly connected between SDOS circuits 306 and 308 and signal line 350 and function similarly to series connected transistors 326 and 328. Series connected transistors 334 and 336 are similarly connected between SDOS circuits 310 and 312 and signal line 350 and function similarly to series connected transistors 326 and 328. Series connected transistors 338 and 340 are similarly connected between SDOS circuits 314 and 316 and signal line 352 and function similarly to series connected transistors 326 and 328. Series connected transistors 342 and 344 are similarly connected between SDOS circuits 318 and 320 and signal line 352 and function similarly to series connected transistors 326 and 328. Series connected transistors 346 and 348 are similarly connected between SDOS circuits 322 and 324 and signal line 352 and function similarly to series connected transistors 326 and 328.

The output of the even signal line 350 is connected to the input of the inverter 354; and the output of the odd signal line 352 is connected to the input of the inverter 356. Transistor 368 has a source connected to the even signal line 350 and a drain connected to ground. The gate of the transistor 368 is biased (not shown) such that the transistor 368 maintains the even signal line 350 at a normally high charged state, and correspondingly maintains the output of the inverter 354 at a normally low state. This high state on the even signal line 350 is maintained until discharged or pulled low as a consequence of speculative decoded operands signals received into any pair of the NMOS pull down transistors connected to the even signal line 350. Having such a configuration and operation as described above, transistor 368 serves as a pre-charge transistor for the even signal line 350. Similarly, the transistor 374 has a source connected to the odd signal line 352 and a drain connected to ground. The gate of the transistor 374 is biased (not shown) such that the transistor 374 functions as a pre-charge transistor for the odd signal line 352.

The transistor 370 has a source connected to the even signal line 350 and a drain connected to ground. The gate of the transistor 370 is connected to the output of the inverter 354. During operation, the connectivity of the transistor 370 and the inverter 354 functions as a keeper circuit to keep or hold the output of the inverter 354 until the input of the inverter 354 changes. The transistor 372 has a source connected to the odd signal line 352 and a drain connected to ground. The gate of the transistor 372 is connected to the output of the inverter 356. During operation, the connectivity of the transistor 372 and the inverter 356 functions as a keeper circuit to keep or hold the output of the inverter 356 until the input of the inverter 356 changes.

MUX 106 comprises a pair of series connected NMOS pull-down transistors 358 and 360; a pair of series connected NMOS pull-down transistors 362 and 364; two PMOS transistors 376 and 378; and an inverter 366. The source of transistor 360 is connected to ground; the drain of transistor 360 is connected to the source of transistor 358; and the drain of transistor 358 is connected to the input of the inverter 366. The gate of the transistor 360 is connected to the output of the inverter 354; and the gate of the transistor 358 is connected to an inverse of a signal labeled as $LSB_{thrd0}*LSB_{thrd1}$, which in this case results from performing an AND operation of $LSB_{thrd0}$ 60 and $LSB_{thrd1}$ 60. Similarly, the source of transistor 364 is connected to ground; the drain of transistor 364 is connected to the source of transistor 362; and the drain of transistor 362 is connected to the input of the inverter 366. The gate of the transistor 364 is connected to the output of the inverter 356; and the gate of the transistor 362 is connected to the signal labeled $LSB_{thrd0}*LSB_{thrd1}$, which results from performing the AND operation of $LSB_{thrd0}$ 60 and $LSB_{thrd1}$ 60.

The transistor 376 has a source connected to the input of the inverter 366 and a drain connected to ground. The gate of the transistor 376 is biased (not shown) such that the transistor 376 functions as a pre-charge transistor for the input of the inverter 366. The transistor 378 has a source connected to the input of the inverter 366 and a drain connected to ground. The gate of the transistor 378 is connected to the output of the inverter 366. During operation, the connectivity of the transistor 378 and the inverter 366 functions as a keeper circuit to keep or hold the output of the inverter 366 until the input of the inverter 366 changes.

Having the illustrated configuration, the output of the MUX, i.e., the output of the inverter 366, is normally low such that no signal 118 is provided to the collision avoidance circuit 108 in the absence of a wordline collision. More particularly, when the speculative sum value derived from adding $OP_{Athrd0}$ with $OP_{Bthrd0}$ is different from the speculative sum value derived from adding $OP_{Athrd1}$ with $OP_{Bthrd1}$, neither the even signal line 350 nor the odd signal line 352 is discharged. As a result, the outputs of inverters 354 and 356 remain low, and the NMOS transistors 360 and 364 remain off. Accordingly, the output of the inverter 366 is low and signal 118 is not provided, irrespective of the values of $LSB_{thrd0}$ 60 and $LSB_{thrd1}$ 60.

However, operation of the circuits 102, 104, and 106 is as follows during a wordline collision event. Since the LSB 60 bits for thread0 and thread1 are ANDed together to provide an input into the gates of transistors 358 and 362, a collision is indicated at the output of the inverter 366 only when $LSB_{thrd0}$ 60 and $LSB_{thrd1}$ 60 have the same value. In other words, the multiplexer is configured to detect the wordline collision only when the least significant bit value $LSB_{thrd0}$ 60 calculated for the first speculative sum value used to generate the first speculative decoded operands signal $SDOS_{thrd0}$ is equal to the least significant bit value $LSB_{thrd0}$ 60 calculated for the second speculative sum value used to generate the second speculative decoded operands signal $SDOS_{thrd1}$.

More particularly, when $LSB_{thrd0}$ 60 and $LSB_{thrd1}$ 60 have a value of binary 1, a high signal is provided to the gate of transistor 362, which turns on this transistor. If contemporaneously, the speculative decoded operands signal for thread0, $SDOS_{thrd0}$, and the speculative decoded operands signal for thread1, $SDOS_{thrd1}$, map to the same odd numbered value, the odd signal line 352 is discharged. This causes inverter 356 to output a high signal, which turns on transistor 364. Having both transistors 362 and 364 high discharges the input of the inverter 366, which results in the signal 118 at the output of the inverter 366 indicating an odd wordline collision.

Similarly, when $LSB_{thrd0}$ 60 and $LSB_{thrd1}$ 60 have a value of binary 0, a high signal is provided to the gate of transistor 358, which turns on this transistor. If contemporaneously, the speculative decoded operands signal for thread0, $SDOS_{thrd0}$, and the speculative decoded operands signal for thread1, $SDOS_{thrd1}$, map to the same even numbered value, the even signal line 350 is discharged. This causes inverter 354 to output a high signal, which turns on transistor 360. Having both transistors 358 and 360 high discharges the input of the inverter 366, which results in the signal 118 at the output of the inverter 366 indicating an even wordline collision.

Accordingly, the wordline collision, between the first and second threads of execution, thread0 and thread1, for accessing the memory array 110 is indicated when the first speculative decoded operands signal $SDOS_{thrd0}$ matches the second speculative decoded operands signal $SDOS_{thrd1}$ and the first and second least significant bit values $LSB_{thrd0}$ 60 and $LSB_{thrd1}$ 60 correspond to a same value. In one particular instance, an even wordline collision is indicated when the first and second least significant bit values $LSB_{thrd0}$ 60 and $LSB_{thrd1}$ 60 both correspond to a binary zero and when the first and second speculative decoded operands signals $SDOS_{thrd0}$ and $SDOS_{thrd1}$ correspond to a same even numbered value. In another instance, an odd wordline collision is indicated when the first and second least significant bit values $LSB_{thrd0}$ 60 and $LSB_{thrd1}$ 60 both correspond to a binary one and when the first and second speculative decoded operands signals $SDOS_{thrd0}$ and $SDOS_{thrd1}$ correspond to a same odd numbered value.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendment made during the pendency of this application and all equivalents of those claims as issued.

For the sake of brevity, conventional techniques related to semiconductor fabrication including those using conventional CMOS technology, CMOS devices, MOSFETs, multiplexers, adder circuits, operand decoding circuits, memory arrays such as caches, and other functional aspects of a system or IC, and the individual system or IC operating components, may not be described in detail. Furthermore, the connecting lines shown in the various figures contained herein are intended to represent example functional relationships and/or physical couplings between the various elements. It should be noted that many alternative or additional functional relationships or physical connections may be present in a practical embodiment. Moreover, the various IC embodiments described above may be produced or fabricated using conventional semiconductor processing techniques, e.g., well known CMOS techniques. Further, a variety of well-known and common semiconductor materials may be used, e.g., traditional metals such as aluminum, copper, gold, etc., polysilicon, silicon dioxide, silicon nitride, silicon, and the like.

In this document, the terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

As used herein, the term "configured to", "configured with", "arranged to", "arranged with", "capable of" and any like or similar terms means that referenced circuit elements have an internal physical arrangement such as by virtue of a particular transistor technology used and/or physical coupling and/or connectivity with other circuit elements in an inactive state. This physical arrangement and/or physical coupling and/or connectivity while in the inactive state enables the circuit elements to perform stated functionality while in the active state of receiving and processing various signals at inputs of the circuit elements to generate signals at the output of the circuit elements. A device or structure that is "configured" in a certain way is configured in at least that way, but may also be configured in ways that are not described.

As further used herein, a "node" means any internal or external reference point, connection point, junction, signal line, conductive element, or the like, at which a given signal, logic level, voltage, data pattern, current, or quantity is present. Furthermore, two or more nodes may be realized by one physical element, and two or more signals can be multiplexed, modulated, or otherwise distinguished even though received or output at a common node.

The above description refers to nodes or features being "connected" or "coupled" together. As used here and, unless expressly stated otherwise, "coupled" means that one node or feature is directly or indirectly joined to or is in direct or indirect communication with another node or feature, and not necessarily physically. As used herein, unless expressly stated otherwise, "connected" means that one node or feature is directly joined to or is in direct communication with another node or feature. For example, a switch may be "coupled" to a plurality of nodes, but all of those nodes need not always be "connected" to each other; moreover, the switch may connect different nodes to each other depending on the state of the switch. Furthermore, although the various circuit schematics shown herein depict certain example arrangement of elements, additional intervening elements, devices, features, or components may be present in an actual embodiment, assuming that the functionality of the given circuit is not adversely affected.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for detecting a collision between multiple threads of execution for accessing a memory array, the method comprising:
   determining, for a first thread of execution, a first speculative decoded operands value by summing a first subset of consecutive bits from a first base operand and a first subset of consecutive bits from a first offset operand;
   determining, for a second thread of execution, a second speculative decoded operands value by summing a first subset of consecutive bits from a second base operand and a first subset of consecutive bits from a second offset operand;
   determining, for the first thread of execution, a first least significant bit value based on a sum of a second subset of bits from the first base operand and a second subset of bits from the first offset operand;
   determining, for the second thread of execution, a second least significant bit value based on a sum of a second subset of bits from the second base operand and a second subset of bits from the second offset operand; and
   determining a word line collision between the first and second threads is indicated when the first speculative decoded operands value matches the second speculative decoded operands value and the first and second least significant bit values correspond to the same value.

2. The method of claim 1, wherein an even wordline collision, between the first and second threads of execution, for accessing the memory array is indicated when the first and second least significant bit values each have a value that is equivalent to a binary zero, and wherein an odd wordline collision, between the first and second threads of execution, for accessing the memory array is indicated when the first and second least significant bit values each have a value that is equivalent to a binary one.

3. The method of claim 1, wherein an even wordline collision is indicated when the first and second least significant bit values both correspond to a binary zero.

4. The method of claim 1, wherein an odd wordline collision is indicated when the first and second least significant bit values both correspond to a binary one.

5. The method of claim 1, wherein the computer-implemented method is performed in parallel with summing the first base operand with the first offset operand to determine a first effective memory address and with summing the second base operand with the second offset operand to determine a second effective memory address.

6. Memory array access and collision detection apparatus comprising:
   an operands decoding circuit configured to:
      determine, for a first thread of execution, a first speculative decoded operands signal based on a first subset of consecutive bits from a first base operand and a first subset of consecutive bits from a first offset operand; and
      determine, for a second thread of execution, a second speculative decoded operands signal based on a first subset of consecutive bits from a second base operand and a first subset of consecutive bits from a second offset operand;
   a first adder circuit configured to determine, for the first thread of execution, a first least significant bit value based on a sum of a second subset of bits from the first base operand and a second subset of bits from the first offset operand;
   a second adder circuit configured to determine, for the second thread of execution, a second constant based on a sum of a second subset of bits from the second base operand and a second subset of bits from the second offset operand; and
   a third logic circuit coupled to the operands decoding circuit and to the first and second adder circuits, wherein the third logic circuit is configured to detect a wordline collision when the first speculative decoded operands signal matches the second speculative decoded operands signal and the first least significant bit value is equal to the second least significant bit value.

7. The apparatus of claim 6, wherein the third logic circuit is further configured to generate a wordline collision signal indicating a detected wordline collision between the first and second threads of execution for accessing the memory array, the system further comprising:
- a collision avoidance circuit coupled between the third logic circuit and the memory array, wherein the collision avoidance circuit is configured to receive the wordline collision signal, a first wordline determined for the first thread of execution, and a second wordline determined for the second thread of execution and to prevent or delay the first or second wordline access to the memory array.

8. The apparatus of claim 6, wherein the third logic circuit comprises a multiplexer circuit, wherein the multiplexer circuit is configured to use the first and second least significant bits as first and second selection bits to detect the wordline collision when the first speculative decoded operands signal matches the second speculative decoded operands signal.

9. The apparatus of claim 8, wherein the multiplexer is configured to detect the wordline collision when the first least significant bit value is equal to the second least significant bit value.

10. A computer-implemented method for detecting a collision between multiple threads of execution for accessing a memory array, the method comprising:
- determining, for a first thread of execution, a first speculative decoded operands signal based on a first subset of consecutive bits from a first base operand and a first subset of consecutive bits from a first offset operand;
- determining, for a second thread of execution, a second speculative decoded operands signal based on a first subset of consecutive bits from a second base operand and a first subset of consecutive bits from a second offset operand; and
- comparing the first speculative decoded operands signal to the second speculative decoded operands signal, and when the first speculative decoded operands signal and the second speculative decoded operands signal have an equivalent value, detecting a wordline collision between the first and second threads when a least significant bit value calculated by summing a second subset of bits from the first base operand with a second subset of bits from the first offset operand is equal to a second least significant value calculated by summing a second subset of bits from the second base operand and a second subset of bits from the second offset operand.

11. The method of claim 10, wherein an even wordline collision is indicated when the first and second least significant bit values correspond to a binary zero and when the first and second speculative decoded operands signals correspond to a same even numbered value.

12. The method of claim 10, wherein an odd wordline collision is indicated when the first and second least significant bit values correspond to a binary one and when the first and second speculative decoded operands signals correspond to a same odd numbered value.

13. The method of claim 1, further comprising providing collision avoidance in response to detecting the wordline collision, wherein the first thread and the second thread attempt to access the same wordline at the same time.

* * * * *